(12) United States Patent
Weller et al.

(10) Patent No.: US 8,157,623 B2
(45) Date of Patent: Apr. 17, 2012

(54) APPARATUS FOR HANDLING OF SAUSAGE CASINGS

(75) Inventors: Frank Weller, Verden (DE); Olaf Grote, Eystrup (DE)

(73) Assignee: VEMAG Maschinenbau GmbH, Verden/Allwer (DE)

(*) Notice: Subject to any disclaimer, the term of this patent is extended or adjusted under 35 U.S.C. 154(b) by 0 days.

(21) Appl. No.: 13/103,239

(22) Filed: May 9, 2011

(65) Prior Publication Data

US 2011/0275297 A1 Nov. 10, 2011

(30) Foreign Application Priority Data

May 7, 2010 (DE) .................. 20 2010 006 603 U

(51) Int. Cl.
*A22C 11/00* (2006.01)
(52) U.S. Cl. ........................................................ 452/32
(58) Field of Classification Search ............. 452/21–23, 452/26, 30–32, 35, 37, 46–48, 51
See application file for complete search history.

(56) References Cited

U.S. PATENT DOCUMENTS

| | | | |
|---|---|---|---|
| 4,434,528 A * | 3/1984 | Niedecker ..................... | 452/37 |
| 4,766,645 A * | 8/1988 | Lamartino et al. ............ | 452/31 |
| 5,056,293 A * | 10/1991 | Richards et al. .............. | 53/116 |
| 5,083,970 A * | 1/1992 | Reutter ........................... | 452/30 |
| 7,182,683 B2 * | 2/2007 | Shefet ............................ | 452/30 |
| 7,381,123 B2 * | 6/2008 | Bachtle ......................... | 452/46 |
| 7,479,058 B2 * | 1/2009 | Baechtle et al. .............. | 452/51 |
| 7,775,861 B2 * | 8/2010 | Sames ........................... | 452/32 |

FOREIGN PATENT DOCUMENTS

| | | |
|---|---|---|
| DE | 3019981 A1 | 12/1981 |
| DE | 3024509 A1 | 1/1982 |
| DE | 3244064 A1 | 5/1984 |
| DE | 4014410 A1 | 11/1991 |
| DE | 4223128 A1 | 1/1993 |
| DE | 102008026095 A1 | 12/2008 |
| EP | 0183229 A1 | 6/1986 |

* cited by examiner

*Primary Examiner* — Richard Price, Jr.
(74) *Attorney, Agent, or Firm* — Wood, Herron & evans, l.l.p.

(57) ABSTRACT

A sausage casing gripping apparatus for use with gathered concertinaed sausage casings and a sausage filling machine. The apparatus includes two gripping elements which are movable relative to each other and which grip the concertinaed sausage casing by a reduction in the intermediate space between the gripping elements and which release the concertinaed sausage casing by an expansion of the intermediate space. The apparatus further includes a drive device for moving at least one of the gripping elements, and at least one lever element for coupling the drive device to at least one gripping element where the gripping element is mounted movably on the lever element.

27 Claims, 6 Drawing Sheets

APPARATUS FOR HANDLING OF SAUSAGE CASINGS

TECHNICAL FIELD & BACKGROUND

The invention concerns a sausage casing gripping apparatus for use with gathered concertinaed sausage casings and a sausage filling machine. The apparatus includes two gripping elements, in other words a first and second gripping element, which are movable relative to each other and which grip the concertinaed sausage casing by a reduction in the intermediate space between the gripping elements and which release the concertinaed sausage casing by an expansion of the intermediate space. The apparatus further includes a drive device for moving at least one of the gripping elements, and at least one lever element, in other words a first lever element and optionally a second lever element, for coupling the drive device to at least one gripping element.

Such sausage casing gripping apparatuses are used with sausage filling machines to apply gathered (concertinaed) sausage casings from a magazine onto a filling tube of the filling machine.

DE 40 14 410 C2 discloses a magazine apparatus for sausage casings comprising two gripper halves for gripping a sausage casing. The gripper halves extend in a substantially horizontal direction and are fixed to stirrups. The stirrups are suspended on carriages which are mounted on and displaceable along two guide shafts. The carriages allow rotary movement about the guide shafts on which they are mounted, whereby the gripper halves can be moved in a direction transverse to the length of the sausage casings. The gripper halves can also be moved towards each other for closing and away from each other for opening. Each gripper half is arranged laterally and is directed towards the sausage casing. The gripping surface of each gripper half comprises two halves arranged at approximately a right angle, and each gripper half makes tangential contact with the sausage casing when the gripper halves close. Accordingly, the gripper halves are designed in the manner of a prism. A support device is arranged beneath the gripper halves substantially in alignment with the central plane of a feed shaft. Retaining plates provide that only one respective sausage casing is disposed in the gripping region of the gripper halves. To receive a sausage casing the gripper halves are rotated outwardly by rotation of the carriages about the guide shafts so that the spacing between the gripper halves is increased. A sausage casing is then dropped onto the support device from the feed shaft. The gripper halves are rotated towards the sausage casing lying on the support device and enclose the sausage casing over its entire length.

Given the dimensions of the feed shaft and the gripper halves, the magazine apparatus is always limited to known types of sausage casing. Sausage casings of a larger diameter than the width of the feed shaft cannot be processed with that magazine apparatus and the gripper halves. The gripper halves would inadequately grip sausage casings of excessively large diameter so that the sausage casings suffer damage while being processed. Sausage casings of excessively small diameter also cannot be processed by this apparatus because the sausage casings cannot be adequately gripped by the gripper halves.

DE 30 19 981 also discloses a magazine apparatus for sausage casings, used for applying a casing onto a packing tube to receive a plastically deformable material such as sausage or cheese.

DE 10 2008 026 095 A1 discloses an apparatus for applying a casing onto a filling tube to produce foodstuff products such as sausages. The apparatus includes a pair of reciprocatable bars driven by a drive mechanism such as a conventional compressed air cylinder unit. An enclosing clamping device is formed by two holding elements of rectangular shape, arranged opposite to each other on either side of the casing. In the closed condition the enclosing clamping device forms a substantially quadrangular space. The bars are arranged substantially horizontally and are moved apart to place the sausage casing in the quadrangular space formed by the holding elements in the closed condition.

DE 30 24 509 discloses a sausage filling machine having a sausage casing gripping apparatus, which involves a comparable working principle. Consequently, the invention in accordance with DE 30 24 509 suffers from the same disadvantages.

DE 30 19 981 discloses another magazine apparatus for sausage casings having a substantially vertical guide shaft which includes two shaft walls. The spacing between the shaft walls can be adjusted symmetrically relative to the vertical central plane of the guide shaft by a spindle which engages the shaft walls with oppositely-threaded screwthreads. The guide shaft is closed at the lower end by a shaft floor of strip-like configuration arranged so that a sausage casing resting on the shaft floor is oriented toward the center of the packing tube. The apparatus in accordance with DE 30 19 981 can be adapted to different sausage casing diameters only with increased complication and expenditure. In order to adapt the apparatus to such sausage casings, the guide shaft must first be emptied of all sausage casings. In addition, the guide shaft can only be adjusted manually.

DE 43 23 128 T2 discloses an apparatus having a supply container for individually separating and applying a concertinaed sausage casing onto a filling tube. The apparatus includes a conveyor belt of V-shaped cross-section, on which the concertinaed sausage casings from the supply container are placed. A height-adjustable centering device with a flat cross-sectional surface then permits the concertinaed sausage casing to be held between the conveyor belt and the centering device. The apparatus includes a second permanent, magnet-excited dc motor to drive the conveyor belt and to further displace the sausage casing in the direction of the filling tube. Additionally, the apparatus has its own drive for adjusting the height of the centering device. The numerous drives with power and control signal cables poses a problem particularly in the foodstuffs industry, by virtue of hygiene requirements.

Therefore the object of the present invention is to provide an apparatus for gripping a sausage casing, in particular a gathered concertinaed sausage casing for a filling machine, which can be operated irrespectively of the diameter of the sausage casing and which can be easily driven and controlled.

SUMMARY OF THE INVENTION

In a first aspect of the invention, that object is attained by a sausage casing gripping apparatus of the kind set forth in the opening part of this specification, the apparatus having a gripping element, for example a first gripping element, which is mounted movably to the lever element, for example a first lever element. This movable mounting allows for relative movement between the first lever element and the first gripping element, for example pivotal movement.

The movable mounting of the gripping element to the lever element makes it possible to implement a relative movement of multiple gripping elements, for example a first and second gripping element, with respect to each other, which can be used for different concertinaed sausage casing sizes without additional adjusting operations. The gripping elements can be moved with a simple drive device, where for example the drive device includes a simple spring element. The movable mounting of the gripping element to the lever element permits flexible adaptation of the gripping element to the shape and mounting of the respective concertinaed sausage casing. The gripping elements form an intermediate space which can be reduced and expanded by the relative movement of the gripping elements toward and away from each other. This relative movement allows the gripping elements to open and close for gripping and releasing a concertinaed sausage casing. To grip a concertinaed sausage casing, the intermediate space between the gripping elements is reduced until it substantially corresponds to the diameter of the concertinaed sausage casing. The pressure force which results from such movement and which is applied to the concertinaed sausage casing permits reliable positioning of the concertinaed sausage casing between the gripping elements without deforming or damaging the sausage casing. Highly accurate positioning of concertinaed sausage casings of different sizes in central alignment with a filling tube of a filling machine is also easily achieved. Preferably the relative movement of the gripping elements is effected by the movement of both gripping elements. However, an advantageous embodiment of the apparatus can be implemented by one immovable gripping element and another movable gripping element. A drive device moves at least one of the gripping elements by transmitting its motion force through the lever element to the respective gripping element. The drive device can be positioned at a location spaced from the gripping elements to prevent the drive device from influencing the concertinaed sausage casing disposed between the gripping elements.

In an advantageous embodiment of the apparatus, a lever element is coupled to both gripping elements. The relative movement of the gripping elements with respect to each other and the central alignment of the concertinaed sausage casing in front of the filling tube is particularly easily achieved by that embodiment. Therefore, to move both gripping elements only one drive device is necessary, which is coupled to the lever element and transmits the motion force of the drive device to both gripping elements.

Another advantageous embodiment is one with gripping elements mounted rotatably to the at least one lever element. That embodiment permits an arrangement of the gripping elements relative to the at least one lever element, which is suitable for carefully gripping a concertinaed sausage casing. Irrespective of the position of the lever element, the gripping elements can be rotated relative to the lever element in a manner favorable for carefully gripping the concertinaed sausage casing.

Another preferred embodiment is one having two lever elements, for example a first and second lever element, arranged parallel to each other and mounted at the same height in a plane parallel to the lever elements. Such an arrangement of the two lever elements is favorable and permits relative movement of the gripping elements toward and away from each other for adjusting the gripping force exerted on the concertinaed sausage casings. The gripping elements are disposed in a plane parallel to the plane of the lever elements. Each gripping element is rotatably mounted in that plane to both lever elements, such that the gripping elements are mutually parallel. The mounting points are disposed substantially at the ends of the lever elements. The parallel orientation of the gripping elements with respect to each other is maintained in any position, which is particularly advantageous for gripping the concertinaed sausage casings. The pressure force applied to the concertinaed sausage casing is substantially constant over the entire diameter range of the casing.

In another advantageous embodiment, the lever elements are rotatably mounted to a support by drive shafts, for example first and second drive shafts. That embodiment provides for a transmission of moment to the lever elements, which allows relative movement of the gripping elements with respect to each other. Each drive shaft is mounted substantially in the center of the lever element and permits transmission of torque, which is distributed equally to both gripping elements. The mounting points of the gripping elements to a lever element are preferably spaced equally relative to the drive shaft. The reduction and expansion of the intermediate space between the gripping elements is effected by rotation of the gripping elements in respectively opposite directions, wherein the gripping elements remain parallel to each other throughout rotation.

In an additional preferred embodiment, the drive device has two ends, for example a first and second end, which are respectively rotatably coupled by a coupling portion, for example a first coupling portion and optionally a second coupling portion, to one of the drive shafts, wherein the coupling point is spaced from the longitudinal axis of the drive shaft. That provides for particularly equal distribution of the torque to the gripping elements, thereby ensuring frictionless movement of the gripping elements. In one embodiment, the coupling portion is of a basic rectangular shape, wherein the drive shaft is mounted to one half of the coupling portion and a respective end of the drive device is rotatably coupled to the other half of the coupling portion. The coupling between the coupling portion and the drive shaft is of a force-locking or positively locking nature so that a torque can be transmitted from the coupling portion to the drive shaft. The spacing between the two coupling points on a single coupling portion creates a torque lever for forces which act at the coupling point of the drive device. A closed force transmission configuration by way of the first drive shaft, to the first lever element, to the gripping elements, to the second lever element, to the second drive shaft, to the coupling portion, and back to the drive device always affords an equal transmission of moment to both gripping elements.

In a second aspect of the invention, a sausage casing gripping apparatus includes two gripping elements which are movable relative to each other and which grip the concertinaed sausage casing by reducing the intermediate space between the gripping elements and which release the concertinaed sausage casing by expanding the intermediate space. The apparatus further includes a drive device for moving at least one of the gripping elements, and at least one lever element for coupling the drive device to at least one gripping element, wherein the drive device has an energy storage feature, capable of storing for example potential spring energy. Thus, the apparatus is operable by one drive device which requires no external connections for providing energy. Thus all cable connections or like connecting elements are superfluous. Additionally, the energy storage feature can contribute to energy-saving operation of the sausage casing gripping apparatus.

A particularly advantageous embodiment is one in which the energy storage feature includes a spring element. That allows the drive device to have a compact structure with the ability to store energy. The spring element stores the deformation energy in one phase of the drive process in order to restore it again to the gripping elements in another phase of the drive process. The spring element is preferably stressed between the ends of the drive device and is enclosed by a sleeve so that dirt, grease, or the like cannot be discharged by the spring into the environment.

In an additional preferred embodiment, the gripping elements are driven by a respective torque resulting from the spring force of the spring element acting on the drive shafts. That embodiment provides a constant and uniform gripping force. The torque-free condition (dead point) of the drive shafts defines the range of relative movement of the gripping jaws, which expands and reduces the intermediate space between the gripping elements. The drive shaft is substantially torque-free in a parallel arrangement of the longitudinal axes of the coupling portions and the drive device.

In a non-parallel arrangement of the longitudinal axes of the coupling portions and the drive device, the torques produced by the spring force of the spring element acting upon the drive shafts cause movement of the gripping elements.

A third aspect of the invention concerns a sausage casing gripping apparatus including two gripping elements which are movable relative to each other and which grip the concertinaed sausage casing by reducing the intermediate space between the gripping elements and which release the concertinaed sausage casing by expanding the intermediate space. The apparatus further includes a drive device for moving at least one of the gripping elements, at least one lever element for coupling the drive device to at least one gripping element, and a guide device for guiding the sausage gripping apparatus along a path of movement. The apparatus further includes at least one abutment arranged adjacent to the path of movement, wherein the abutment can trigger the relative movement of the gripping elements for expanding and reducing the intermediate space between the gripping elements.

The relative movement of the gripping elements with respect to each other for expanding and reducing the intermediate space can be initiated without external energy or a control signal. In the displacement of the sausage casing gripping apparatus along a path of movement, at least one abutment, for example a first and second abutment, ensures that the gripping elements are moved either toward each other or away from each other. Preferably, the path of movement of the apparatus is linear.

In a particularly preferred embodiment, the lever elements are mounted to a support rotatably by drive shafts and the support is connected to a guide device operating as a second drive device, which operates to displace the sausage casing gripping apparatus along the path of movement. That embodiment ensures that the sausage casing gripping apparatus is displaceable past the abutment for triggering the relative movement of the gripping elements. In addition, this embodiment permits transportation of the concertinaed sausage casing from a magazine between the gripping elements to a filling tube spaced from the magazine.

The advantageous embodiment in which the sausage casing gripping apparatus is mounted pivotally about an axis parallel to the path of movement ensures a compact arrangement of the sausage casing gripping apparatus relative to a magazine in which the sausage casings are stored and relative to the filling tube which fills the concertinaed sausage casings with sausage meat.

In another advantageous embodiment, the lever element has an actuating element which can be brought into contact with a first abutment and which is actuated upon displacement of the sausage casing gripping apparatus past the first abutment so that the gripping elements move away from each other and the intermediate space between the gripping elements expands.

In another advantageous embodiment, a portion of one of the gripping elements cooperates with a second abutment in the displacement of the sausage casing gripping apparatus so that the gripping elements move toward each other and the intermediate space between the gripping elements is reduced. In a particularly advantageous embodiment, the actuating element is arranged on an arm fixed to the lever element, displaced in the direction of the drive shaft, and edged by an impact-resistant material. In a particularly simple manner, that embodiment ensures the triggering of the relative movement of the gripping elements which expands the intermediate space between the gripping elements. The arm provides an additional lever for the transmission of a torque which results from the cooperation of the abutment with the actuating element when the concertinaed sausage casing gripping apparatus moves past the abutment. The impact-resistant, preferably elastic material reduces wear even in long-term use of the gripping apparatus.

A further advantageous embodiment has a first abutment which cooperates with the actuating element only in one direction of travel of the sausage casing gripping apparatus. Expansion of the intermediate space between the gripping elements is effected upon movement of the sausage casing gripping apparatus toward the filling tube, whereby the concertinaed sausage casing is simultaneously drawn over the filling tube. To maintain the gripping elements in the opened position during the return movement of the sausage casing gripping apparatus, it is advantageous if the first abutment cooperates with the actuating element only in one direction of travel. A further embodiment of the invention with a second abutment includes a wall portion to which the sausage casing gripping apparatus is mounted and which provides for triggering of the closing movement of the gripping elements in a particularly simple manner. For that purpose, the end of a gripping element makes contact with the wall portion and thereby experiences an impulse which initiates the closing movement of the gripping elements.

Another advantageous embodiment includes a third abutment which is mounted to the support and limits the rotary movement of the second lever element so that the gripping elements move away from each other only as far as a defined spacing. That embodiment easily ensures that the rotation of the lever element is stopped upon becoming substantially perpendicular to the gripping elements. Further rotation of the lever elements beyond that vertical position would convert the opening movement of the gripping elements into a closing movement. This third abutment can thus ensure that the gripping elements stop in the opened position.

In an advantageous embodiment, the guide device, operating as a second drive device, includes a rolling ring transmission, a screwthreaded spindle, or a pneumatic cylinder. That embodiment makes it possible to implement a guide device to displace the entire sausage casing gripping apparatus, while simultaneously preventing dirt deposits. The rolling ring transmission, the screwthreaded spindle, or the pneumatic cylinder is used in combination with a rotatable guide bar.

In addition, the drive device is provided with a damper element. Preferably the drive device is in the form of a spring leg. Damping of the drive device permits a damped movement of the gripping elements, which allows the sausage casing to stop in its original relative position with respect to the gripping elements. Upon first contact of the gripping elements with the concertinaed sausage casing, the impulse is weakened so that it is possible to handle the concertinaed sausage casing in a particularly careful manner.

In another advantageous embodiment, a prismatic or prism-like structure is formed between the inside surfaces of the gripping elements, thereby allowing the gripping elements to make tangential contact with the concertinaed sausage casings, and the recesses of the gripping elements are optionally provided with an additional adhesion layer, or in other words a gripping layer. Concertinaed sausage casings of differing sizes can always be reliably gripped with this embodiment with a prism-like configuration between the gripping elements. That affords a particularly advantageous holding force in the direction of the longitudinal axis of the gripping element. Particularly when drawing a concertinaed sausage casing over the filling tube, the adhesion layer ensures reliable transmission of force from the gripping elements to the concertinaed sausage casing. It is thus possible to prevent the concertinaed sausage casing from slipping in the gripping elements when being drawn onto the filling tube.

A preferred embodiment has an adhesion layer formed by a plurality of thin strips, preferably of silicone or nitrile rubber or polyurethane, arranged transversely to the longitudinal axis of the gripping element over the entire length of the gripping element.

In another advantageous embodiment, a first gripping element is adapted to catch a concertinaed sausage casing which rolls or falls from a magazine. That embodiment ensures that a concertinaed sausage casing is reliably received from a magazine. For that purpose, the gripping element has at least one enlarged and angled side wall portion, and it is also advantageous for the length of the gripping element to approximately correspond to that of the sausage casing. Therefore, even slightly bent concertinaed sausage casings can be gripped between the gripping elements so that they can be pushed onto a filling tube without difficulty.

BRIEF DESCRIPTION OF THE DRAWINGS

An embodiment of the invention is described with reference to the accompanying drawings.

DETAILED DESCRIPTION

Figure 1A:
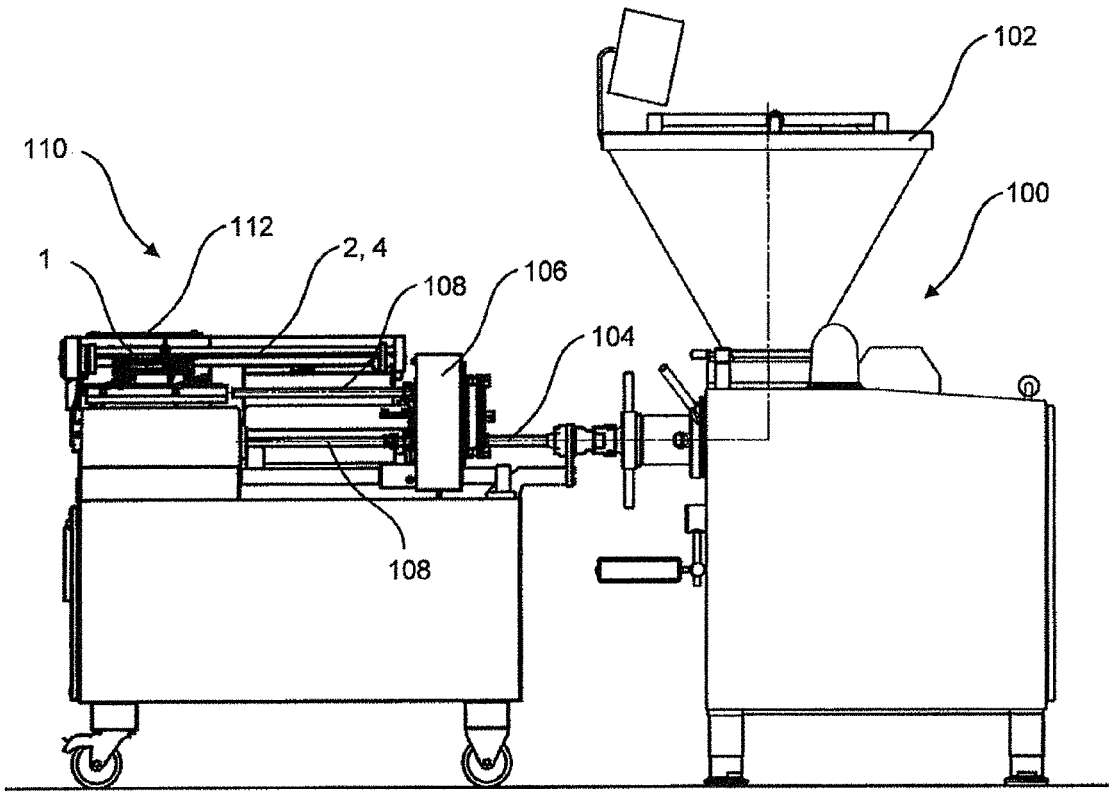
FIGS. 1A and 1B show a side view and a plan view respectively of the embodiment of a sausage casing gripping apparatus in combination with a sausage filling machine.
Figure 1B:
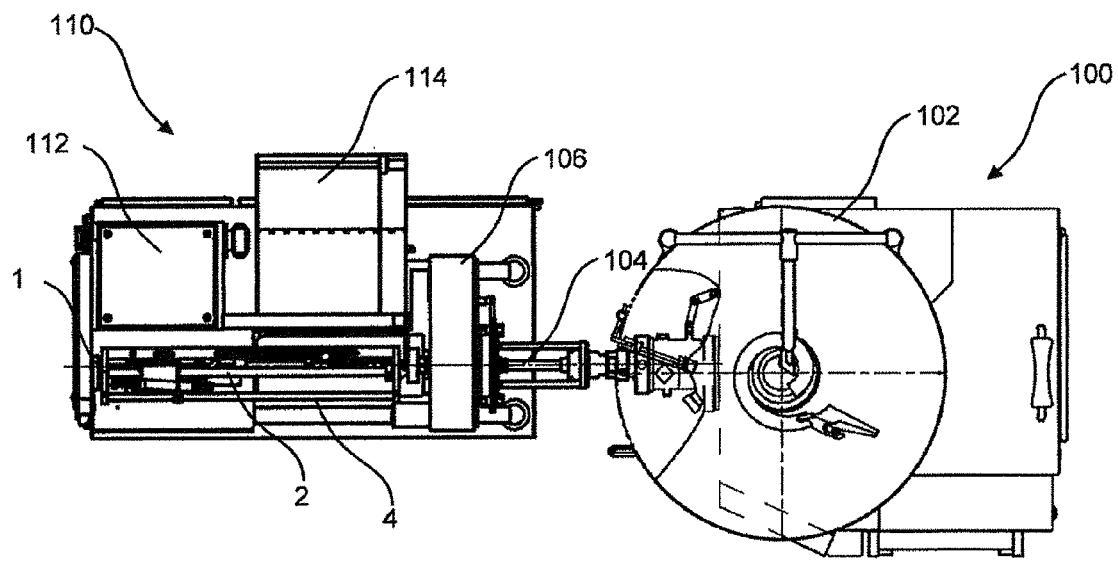

FIGS. 1A and 1B show a sausage filling machine 100 in conjunction with an accessory device 110 on which the sausage casing gripping apparatus 1 is mounted. The sausage filling machine 100 has a filling hopper 102 and a discharge tube 104 connected to a rotatable revolver magazine 106 on the accessory device 110. Two filling tubes 108 are mounted horizontally on the magazine 106. In addition, a drive unit 112 and a magazine apparatus 114 are disposed on the accessory device 110, the magazine apparatus 114 being stocked with a multiplicity of concertinaed sausage casings. The sausage casing gripping apparatus 1 is supported on two guide rails 2, 4 at the height of the magazine apparatus 114.

Figure 2A:
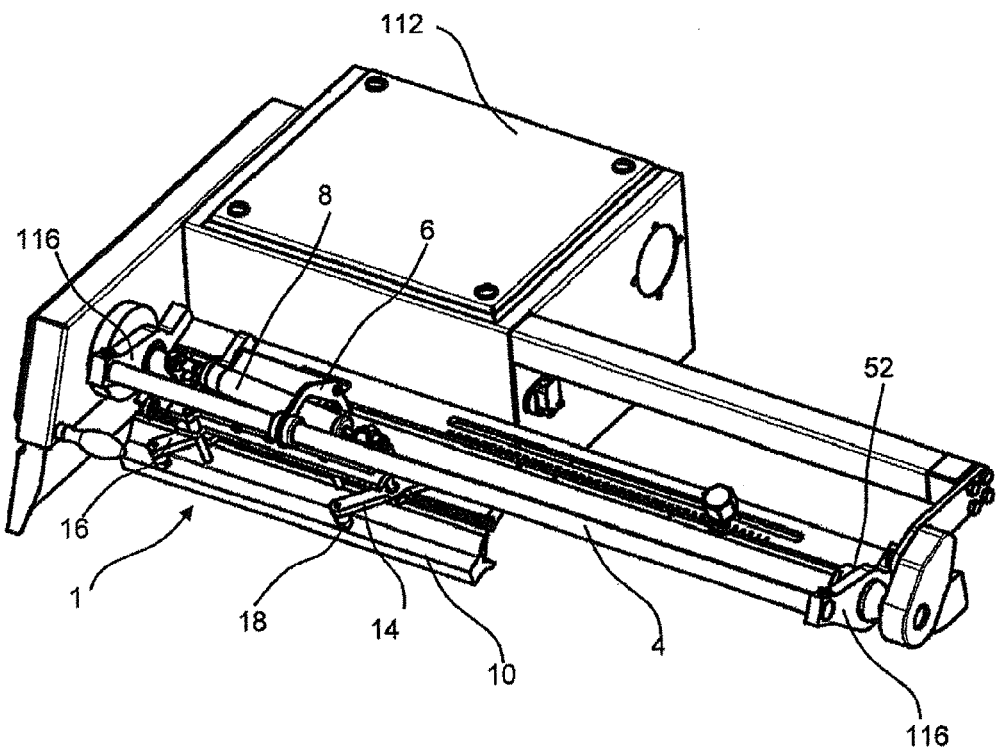
FIGS. 2A-2D show a perspective view and a side view respectively of the sausage casing gripping apparatus on a guide rail in two different positions.
Figure 2B:
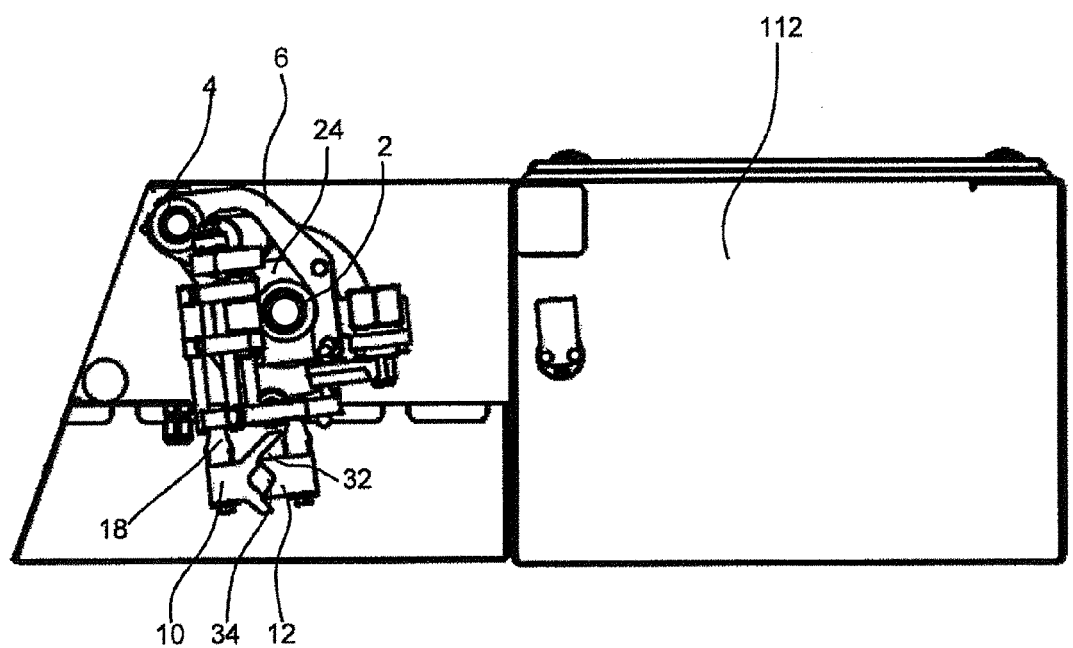
Figure 2C:
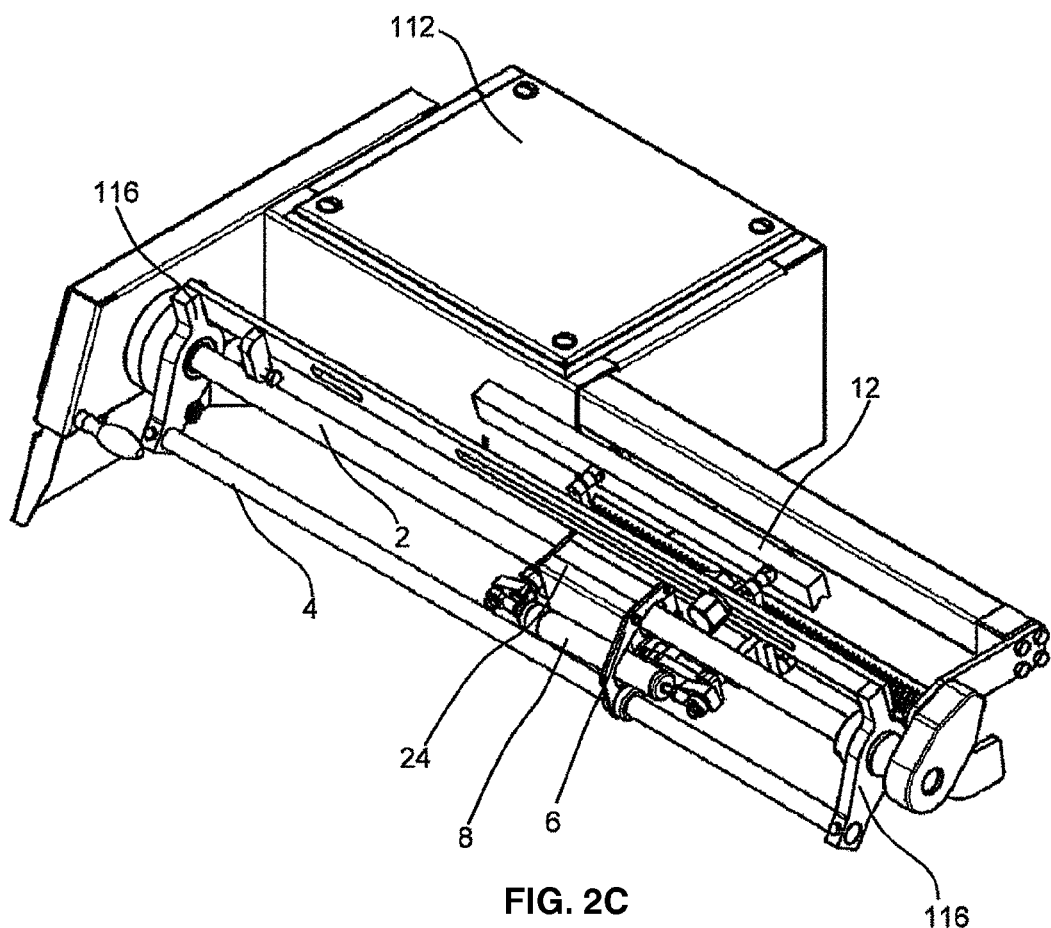
Figure 2D:
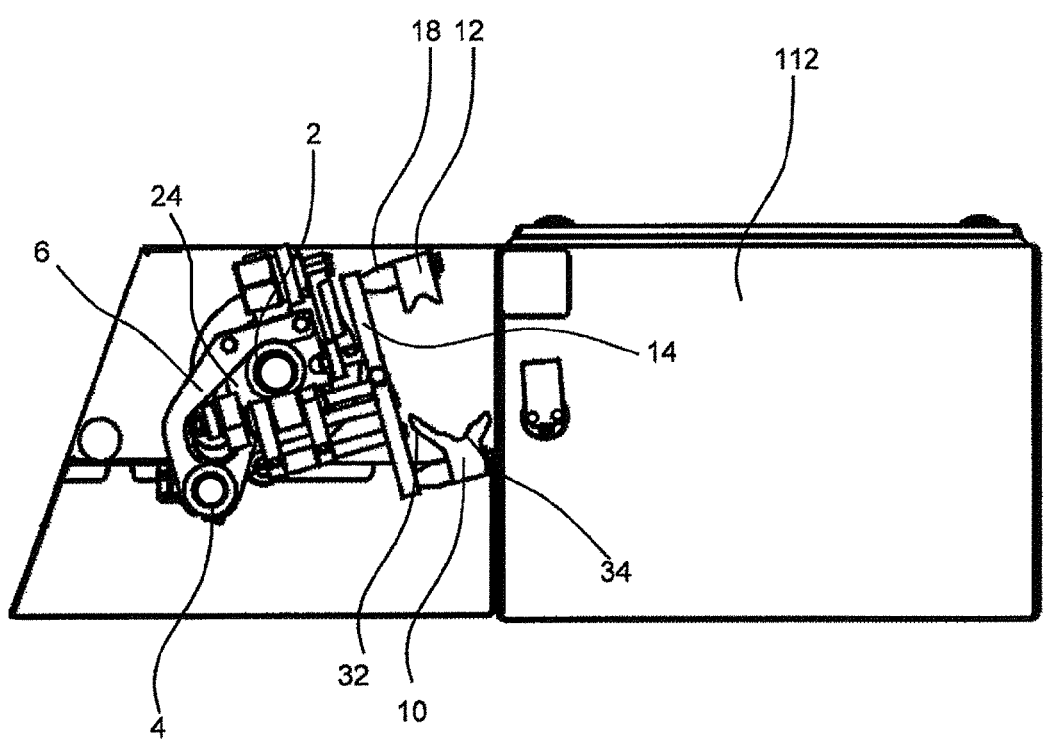

FIGS. 2A and 2B shows the sausage casing gripping apparatus 1 supported by a guide device 24 and a guide arm 6 on two guide rails 2, 4, which are arranged in mutually parallel relationship. The sausage casing gripping apparatus 1 is mounted pivotally about the guide rails 2, 4. Mounted at the ends of the guide rails 2, 4 are two head plates 116, by which the guide rails 2, 4 are jointly connected and rotatably mounted. To rotate the guide rails 2, 4, a drive unit 112 is provided adjacent to the magazine apparatus 114 (FIG. 1B) and the guide rails 2, 4 of the sausage casing gripping apparatus 1. The drive unit 112 is shown in FIGS. 2A and 2B in the simplified form of a box. The sausage casing gripping apparatus 1 is shown in FIGS. 2C and 2D with the gripping elements 10, 12 opened and in the process of pivoting into place. In this position the notional centerline of the intermediate space Z (FIG. 6A) between the gripping elements 10, 12 is oriented in concentric relationship with the filling tube 108 (not shown here). The sausage casing gripping apparatus 1 is disposed in a second position immediately adjacent to the magazine apparatus 114. In that position the sausage casing gripping apparatus 1 is positioned at an angle so that a first lower gripping element 10 is arranged closer to the magazine apparatus 114 than the second upper gripping element 12.

Figure 3:
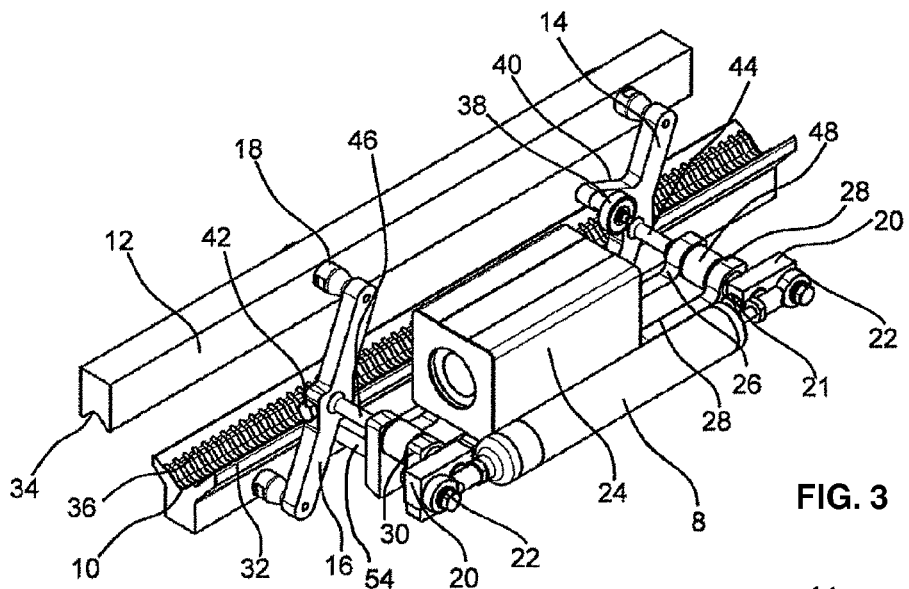
FIG. 3 shows a perspective view of a half-opened sausage casing gripping apparatus.
Figure 4:
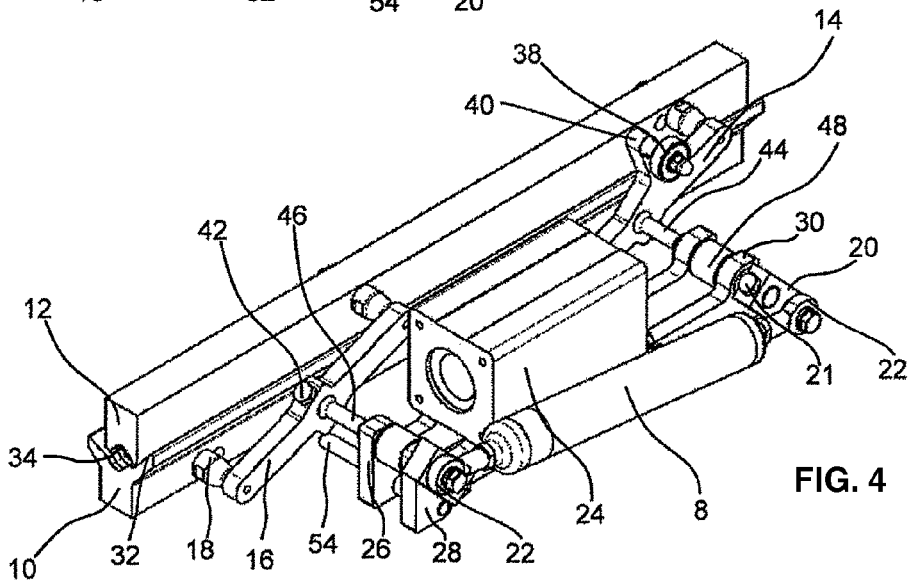
FIG. 4 shows a perspective view of a completely closed sausage casing gripping apparatus.
Figure 5:
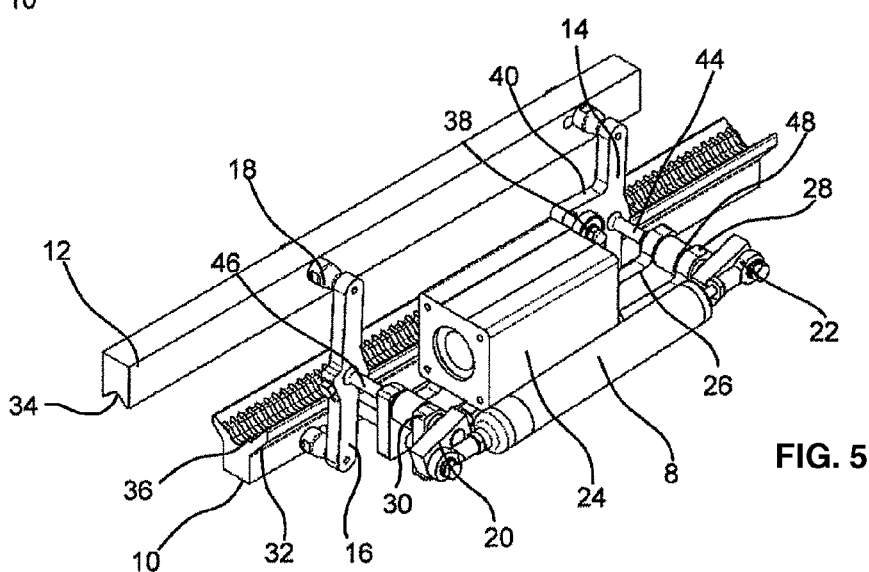
FIG. 5 shows a perspective view of a completely opened sausage casing gripping apparatus.

The gripping elements 10, 12 of the sausage casing gripping apparatus 1 are arranged in mutually parallel relationship along their longitudinal axes, as shown in FIGS. 3 through 5. The gripping elements are of a bar-shaped configuration with a generally quadrangular profile and are configured so that a prismatic or prism-like structure is formed between their inside surfaces such that concertinaed sausage casings of different sizes can be centered and reliably gripped by the gripping elements. The inside surfaces, or in other words the recesses 34, of the gripping elements 10, 12 are optionally provided with an additional adhesion layer 36, or in other words a gripping layer, formed by a plurality of thin strips arranged transversely to the longitudinal axis of the gripping element over the entire length of the gripping element. The first gripping element 10 is adapted to receive a concertinaed sausage casing that rolls from the magazine apparatus 114. For that purpose the first gripping element 10 has two angled side wall portions 32 which enlarge the inside region or support region of the first gripping element 10 for supporting the concertinaed sausage casing. The side wall portion 32, which is depicted in FIG. 3 at the front and immediately adjacent to the remaining components of the sausage casing gripping apparatus, is longer than the oppositely disposed side wall portion 32, which is depicted at the rear in FIG. 3. The side walls of each gripping element 10, 12 are also provided with two bores for accommodating the rotary mounting arrangement with ever elements 14, 16.

Two lever elements 14, 16 are fixed to the drive shafts 44, 46. In this embodiment the lever elements 14, 16 are produced from flat bars, but they can also be of other shapes. Mounted at the ends of the lever elements 14, 16 are rotary mountings 18, by which each lever element 14, 16 is rotatably connected to both gripping elements 10, 12. The rotary mountings 18 are disposed in symmetrical relationship with each other from either side of the center of the lever element 14, 16. The rotary mountings 18 are respectively secured by screw nuts at the opposite side wall. A first lever element 14 has an arm 40 projecting perpendicularly from the side of the lever element on which an actuating element 38 is arranged. The actuating element 38 is displaced in the direction of the drive shaft 44, 46, is in the form of a roller, and is edged with an impact-resistant material. A respective drive shaft 44, 46 is connected in central relationship to the lever element 14, 16. The drive shaft 44, 46 is connected by screws 42 to the lever element 14, 16 so that a torque can be transmitted from the drive shaft 44, 46 to the lever element 14, 16. Formed on the lever element 14, 16 for the screws 42 are shoulders which also serve as a quadrangular reinforcement of the lever element 14, 16, as clearly seen in FIG. 6B.

The drive shaft 44, 46 is of a small diameter over its entire length, and that diameter is interrupted only by a shaft shoulder 48 approximately at the center of the drive shaft 44, 46. Provided for supporting the drive shafts 44, 46 is a support which here is in the form of two support plates 26, 28. The support plates are each disposed at a respective side of the shaft shoulder 48 and are arranged parallel to both the gripping elements 10, 12 and the lever elements 14, 16, and arranged perpendicularly to the drive shafts 44, 46. A third abutment 54 in the form of a cylindrical bar is arranged beneath the second drive shaft 46 to limit the rotary movement of the second lever element 16 so that the gripping elements 10, 12 can move away from each other only to a defined spacing. The action of the third abutment 54 can be clearly seen in FIG. 5. A bore is provided in the projections 30 for accommodating the drive shafts 44, 46. Accordingly, on the side of second support plate 28 opposite to the gripping elements 10, 12, a portion of the drive shafts extends out of the second support plate 28 for connection to a respective coupling portion 20.

The coupling portions 20 are in the form of a rectangular block and have a bore through one half of the block for connection to a respective drive shaft 44, 46. A screw 21 provides a positively locking connection between the coupling portion 20 and the respective drive shaft 44, 46 to permit torque transmission therebetween. Disposed on the second half of each coupling portion 20 is a bore for rotatably mounting a drive device 8. A respective screw for connecting the coupling portion 20 to a respective end 22 of the drive device 8 is passed through the bore. The two coupling portions 20 are positioned on the drive shafts so that the bores for the drive device 8 are directed outwardly. In addition, the coupling portions 20 are always parallel to each other.

The drive device 8 is in the form of a spring leg and has an energy storage feature in the form of a spring element (not visible here) and a damping feature integrated in the spring leg. The spring element can be for example a coil spring or another spring. The energy storage and damping features are disposed between the two end portions 22 for connection of the drive device 8 to the coupling portions 20. The longitudinal axis of the drive device 8 extends parallel to the longitudinal axes of the gripping elements 10, 12, the support plates 26, 28, and the coupling portions 20. The spacing on the coupling portions 20 between the mounting of the drive device 8 and the drive shafts 44, 46 results in a lever arm for a torque created by the spring force of the spring element. Transmission of that torque from the coupling portions 20 by way of the drive shafts 44, 46 and the lever elements 8 to the gripping elements provides for the relative movement of the gripping elements with respect to each other. In a parallel arrangement of the longitudinal axes of the coupling portions 20 and the drive device 8, the drive shafts 44, 46 are substantially in a torque-free position (also referred to as the dead point), as shown in FIG. 3.

A guide device 24 operating as a second drive device in the form of a rolling ring nut is shown in FIG. 3 as a box with a through bore and is disposed between the drive shafts 44, 46 in the central region of the support plates 26, 28. The guide device is connected to a guide rail 2, the axis of which is oriented parallel to the longitudinal axis of the gripping elements 10, 12. The guide device, shown in FIG. 3 as a rolling ring nut, is fixedly connected to and carried by both support plates, and provides for the linear movement of the sausage casing gripping apparatus 1 along the guide rail 2.

Figure 6A:
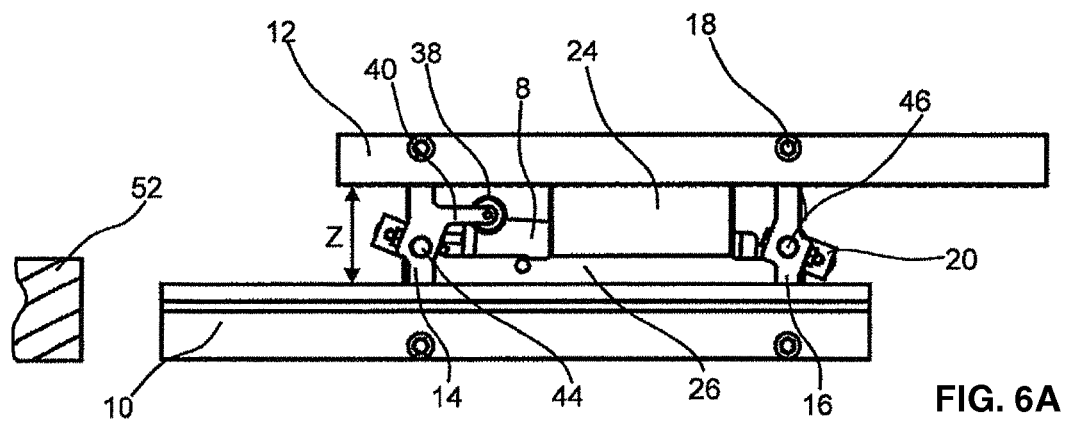
FIGS. 6A-D show a side view of four sequences of the closing movement of the sausage casing gripping apparatus.
Figure 6B:
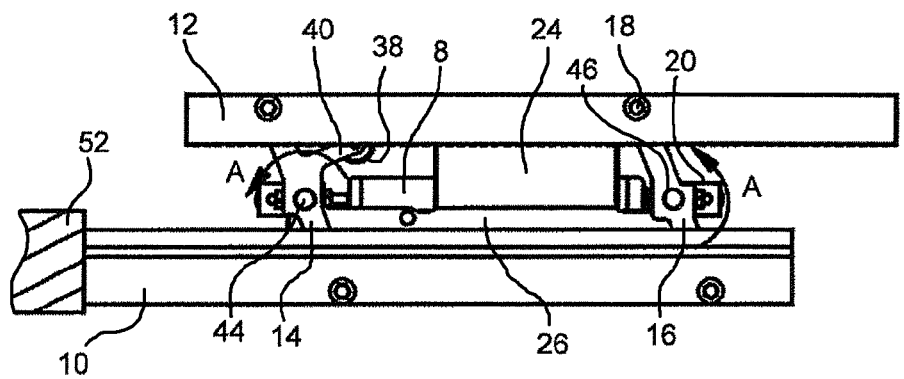
Figure 6C:
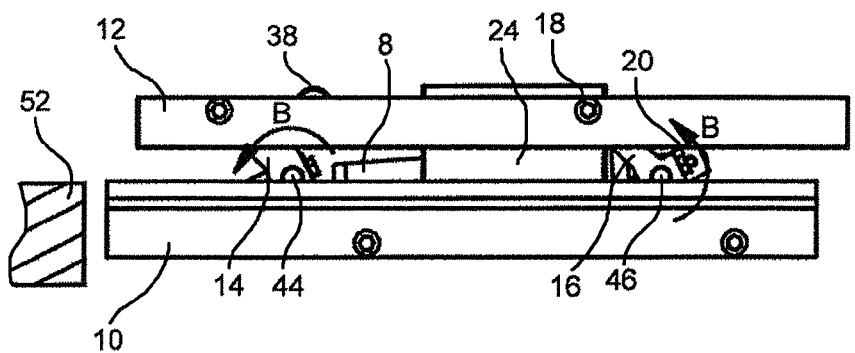
Figure 6D:
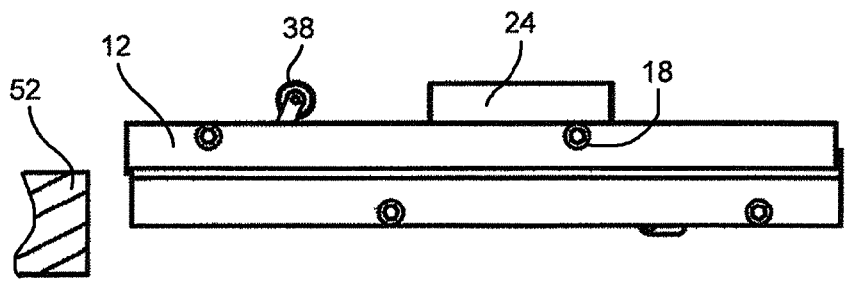
Figure 7A:
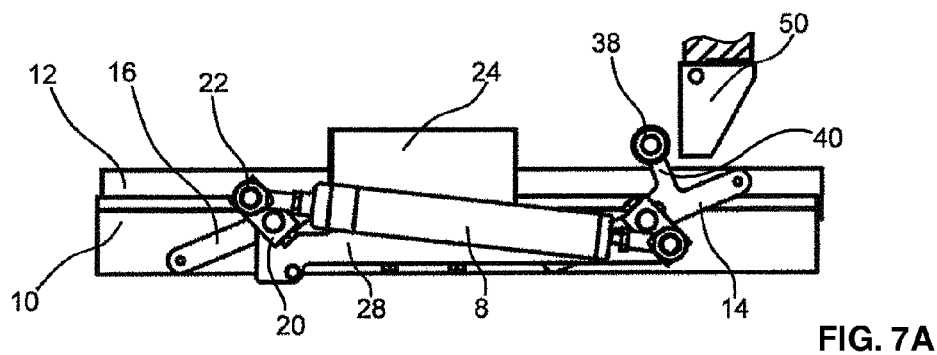
FIGS. 7A-D show a side view of four sequences of the opening movement of the sausage casing gripping apparatus.
Figure 7B:
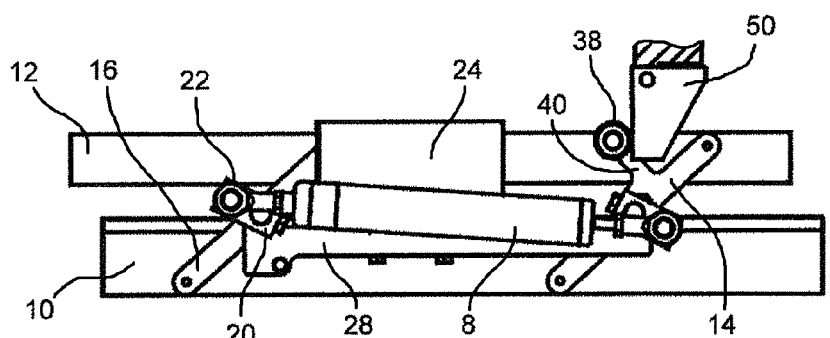
Figure 7C:
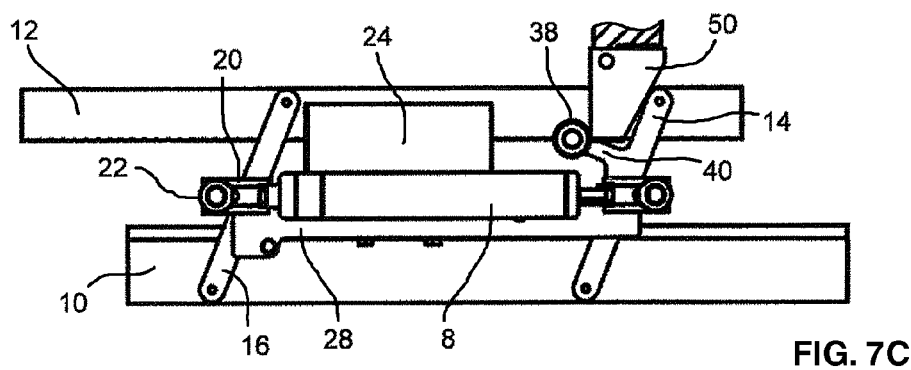
Figure 7D:
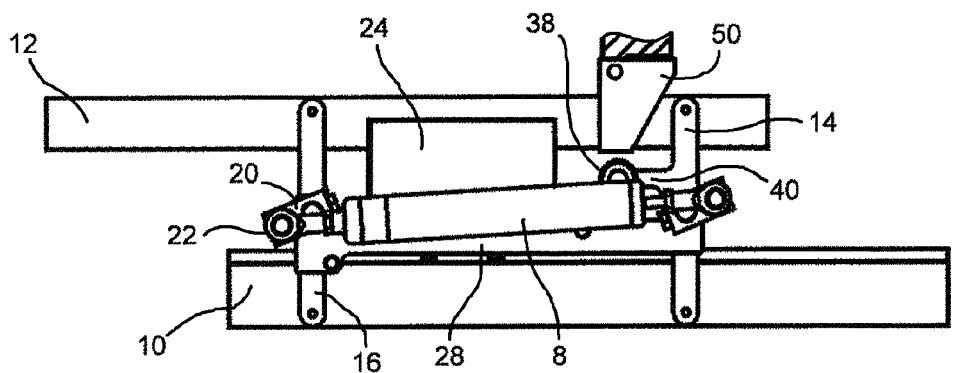

To close the gripping elements 10, 12, the sausage casing gripping apparatus 1 is moved by the guide device 24 against a second abutment 52, which is in the form of a wall portion of the accessory device 110, as shown in FIGS. 6A through 6B. In the completely opened position, the second lever element 16 is disposed directly against the third abutment 54. In that position the intermediate space Z between the gripping elements 10, 12 is at its maximum size. Upon contact with the second abutment 52, the first gripping element 10 experiences a force in a direction opposite to the direction of travel of the gripping apparatus 1. That results in a moment A necessary for moving beyond the torque-free position, at which point the torque B resulting from the spring force of the first drive device 8 is alone sufficient to close the gripping elements 10, 12. The closing movement of the gripping elements 10, 12 is concluded as soon as the intermediate space Z has reached the diameter of the concertinaed sausage casing to be gripped.

To open the gripping elements 10, 12 the sausage casing gripping apparatus 1 moves toward the first abutment 50, as shown in FIGS. 7A through 7D. The abutment 50 is arranged so that the actuating element 38 makes contact with the first abutment 50 during linear travel of the sausage casing gripping apparatus 1. The abutment 50 is mounted rotatably so that it cooperates with the actuating element 38 in only one direction of travel of the sausage casing gripping apparatus 1, when the actuating element 38 reaches the vertical edge of the abutment 50. Otherwise the contact between the actuating element 38 and the first abutment 50 results in rotation of the abutment 50. Upon contact of the actuating element 38 with the vertical edge of the first abutment 50, the length of the arm 40 acts as a torque lever for a pressure force resulting from the displacement of the sausage casing gripping apparatus 1 relative to the abutment 50. The torque acts upon the lever element 14 for as long as the actuating element remains in contact with the first abutment 50 and the sausage casing gripping apparatus 1 is displaced relative to the abutment 50. The torque then ceases shortly before the gripping elements 10, 12 reach the completely opened position.

The filling tube 108 is operated by the following steps. The sausage casing gripping apparatus is moved to a position adjacent to the magazine apparatus 114 with the gripping elements 10, 12 in the opened position. The concertinaed sausage casing rolls out of the magazine apparatus onto the inside surface, or in other words the recess 34, of the first gripping element 10 and is automatically positioned centrally relative to the gripping element 10 as a result of the prismatic shape of the inside surface of the gripping element. In order to receive the sausage casing, the first gripping element 10 is pivoted toward the magazine apparatus so as to minimize the spacing between the magazine apparatus and the enlarged side wall portion 32 of the gripping element. As soon as the sausage casing is positioned between the gripping elements 10, 12, the sausage casing gripping apparatus 1 is moved toward the second abutment 52 and is then closed. Irrespective of the diameter of the concertinaed sausage casing (its caliber), the gripping elements 10, 12 grip the sausage casing in such a manner that the sausage casing is oriented in concentric relationship with the centerline of the intermediate space Z between the gripping elements 10, 12. With the gripping elements 10, 12 in the closed position, the sausage casing gripping apparatus 1 moves with the sausage casing along the guide rail 2 toward the oppositely disposed head plate 116 and pivots downwardly so that the centerline of the intermediate space between the gripping elements 10, 12 is oriented concentrically with the filling tube 108. The sausage casing gripping apparatus 1 moves in the direction of the filling tube 108 and pulls or pushes the sausage casing onto the filling tube 108. The holding force exerted on the sausage casing by the gripping elements is greater than the sliding friction force acting between the sausage casing and the filling tube 108.

Alternatively, one of the gripping elements 10, 12 can be provided with at least one additional abutment for pushing against the concertinaed sausage casing. That abutment would be arranged substantially perpendicularly to the longitudinal axis of the gripping element, preferably at the inside surface of the gripping element 10. When the concertinaed sausage casing is drawn onto the filling tube 108, such an abutment, aside from the holding force, would exert an additional axial force on the sausage casing.

While the sausage casing is being pulled or pushed onto the filling tube, the sausage casing gripping apparatus passes the first abutment 50 and opens its gripping elements 10, 12 so that the sausage casing is released. The sausage casing gripping apparatus 1 then translates back in the direction of the opposite head plate 116 and is moved into the position for receiving a fresh concertinaed sausage casing by pivotal movement of the guide rails 2, 4.

The invention is not limited to the embodiment described herein and can also be carried into effect by differing variants.

The invention claimed is:

1. A sausage casing gripping apparatus for use with gathered concertinaed sausage casings and a sausage filling machine, comprising:
    first and second gripping elements and an intermediate space between the first and second gripping elements, the first and second gripping elements being movable relative to each other and configured to grip the concertinaed sausage casing by a reduction of the intermediate space, the first and second gripping elements further configured to release the concertinaed sausage casing by an expansion of the intermediate space;
    a drive device for moving the first gripping element;
    a first lever element coupling the drive device to the first gripping element;
    a second lever element, wherein the first and second lever elements are coupled to both the first and second gripping elements; and
    a mounting between the first lever element and the first gripping element, the mounting allowing relative movement between the first lever element and the first gripping element.

2. The apparatus of claim 1, wherein the first gripping element operates as a lower gripping element and the second gripping element operates as an upper gripping element.

3. The apparatus of claim 1, wherein the mounting between the first lever element and the first gripping element allows for rotational movement between the first lever element and the first gripping element.

4. The apparatus of claim 3, wherein the first and second gripping elements are mounted for rotation to the first lever element.

5. The apparatus of claim 1, wherein:
    the first and second lever elements are arranged in a mutually parallel relationship and are mounted at the same height in one plane passing through both lever elements.

6. The apparatus of claim 5, further comprising:
    a support;
    first and second drive shafts; and
    a longitudinal axis corresponding to each of the first and second drive shafts;
    wherein the first and second lever elements are mounted for rotation on the support by the first and second drive shafts.

7. The apparatus of claim 6, further comprising:
    first and second ends on the drive device; and
    first and second coupling portions;
    a longitudinal axis corresponding to each of the first and second coupling portions;
    wherein each end of the drive device is respectively coupled for rotation by a coupling portion to one of the first and second drive shafts, and each coupling point is offset from the longitudinal axis of its respective drive shaft.

8. The apparatus of claim 7, wherein the drive device comprises a spring element that stores potential spring energy for moving the first and second gripping elements.

9. The apparatus of claim 8, wherein the spring element is operatively coupled to the first and second drive shafts to drive the first and second gripping elements with a resulting torque.

10. The apparatus of claim 9, wherein a parallel arrangement of the longitudinal axes of the first and second coupling portions and the drive device results in the first drive shaft being substantially torque-free.

11. The apparatus of claim 5, further comprising:
    a third abutment mounted to the support;
    wherein the third abutment cooperates with the second lever element to limit the rotational movement of the second lever element so that the gripping elements move away from each other only to a defined spacing.

12. The apparatus of claim 1, further comprising:
    a guide device for guiding the sausage casing gripping apparatus along a path of movement; and
    a first abutment arranged adjacent to the path of movement;
    wherein the first abutment triggers the relative movement of the first and second gripping elements for expanding and reducing the intermediate space between the first and second gripping elements.

13. The apparatus of claim 12, wherein the guide device operates as a second drive device for displacing the apparatus along a path of movement.

14. The apparatus of claim 13, further comprising:
    a support;
    wherein the first lever element is mounted for rotation to the support by the first drive shaft, and the support is connected to the guide device.

15. The apparatus of claim 13, further comprising:
    a support;
    wherein the guide device, the support, the drive device, the first lever element, and the first and second gripping elements are collectively mounted so as to allow rotation thereof about an axis parallel to the path of movement.

16. The apparatus of claim 13, wherein the first lever element further comprises:
    an actuating element;
    wherein the actuating element contacts the first abutment and is actuated upon collective displacement of the guide device, the support, the drive device, the first lever element, and the first and second gripping elements past the first abutment so that the first and second gripping elements move apart, thereby expanding the intermediate space between the first and second gripping elements.

17. The apparatus of claim 16, wherein the actuating element is arranged on an arm fixed to the first lever element, and furthermore is displaced in the direction of the first drive shaft and edged by an impact-resistant material.

18. The apparatus of claim 16, wherein the first abutment cooperates with the actuating element in only one direction of travel of the guide device, the support, the drive device, the first lever element, and the first and second gripping elements collectively.

19. The apparatus of claim 13, further comprising:
a second abutment;
wherein a portion of the first gripping element cooperates with the second abutment in the collective displacement of the guide device, the support, the drive device, the first lever element, and the first and second gripping elements so that the first and second gripping elements move toward each other and the intermediate space between the first and second gripping elements is reduced.

20. The apparatus of claim 19, wherein the second abutment comprises a wall portion to which the guide device, the support, the drive device, the first lever element, and the first and second gripping elements are collectively mounted.

21. The apparatus of claim 13, wherein the guide device includes one of a rolling ring transmission, a screw-threaded spindle, a pneumatic cylinder, a linear motor, or a linear toothed belt or chain guide.

22. The apparatus of claim 1, wherein the drive device is provided with a damper element for damping the movement of the first and second gripping elements so as to allow for careful gripping of the concertinaed sausage casings without causing damage to the concertinaed sausage casings.

23. The apparatus of claim 22, wherein the damper element includes a spring leg.

24. The apparatus of claim 1, wherein the first and second gripping elements each further comprise:
a longitudinal axis; and
a recess;
wherein each recess substantially spans the longitudinal axis of its respective gripping element and is configured so as to interact with a concertinaed sausage casing at two or more regions of tangential contact.

25. The apparatus of claim 24, further comprising:
an additional gripping layer disposed in the recess of the first gripping element for increasing the holding force exerted by the first and second gripping elements on the sausage casing.

26. The apparatus of claim 25, wherein the additional gripping layer comprises a plurality of thin strips arranged transversely to the longitudinal axis of the first gripping element over entire length of the first gripping element.

27. The apparatus of claim 1, wherein the first gripping element is adapted to receive a concertinaed sausage casing which rolls or falls from a magazine.

* * * * *